United States Patent
Kim et al.

(10) Patent No.: US 9,513,509 B2
(45) Date of Patent: Dec. 6, 2016

(54) LIQUID CRYSTAL DISPLAY

(71) Applicant: SAMSUNG DISPLAY CO., LTD., Yongin, Gyeonggi-Do (KR)

(72) Inventors: Jin-Hoon Kim, Hwaseong-Si (KR); Kwang-Hyun Kim, Gunpo-Si (KR); Dae Won Kim, Suwon-Si (KR); Seung Beom Park, Hwaseong-Si (KR); Beong-Hun Beon, Hwaseong-Si (KR); Seung Hee Lee, Hwaseong-Si (KR); Yun Jang, Hwaseong-Si (KR); Na Young Shin, Hwaseong-Si (KR); Sang-Gu Lee, Hwaseong-Si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 117 days.

(21) Appl. No.: 14/160,055

(22) Filed: Jan. 21, 2014

(65) Prior Publication Data

US 2015/0022763 A1     Jan. 22, 2015

(30) Foreign Application Priority Data

Jul. 17, 2013   (KR) .................. 10-2013-0084330

(51) Int. Cl.
*G02F 1/1335*       (2006.01)
*G02F 1/13363*     (2006.01)

(52) U.S. Cl.
CPC ..... *G02F 1/133634* (2013.01); *G02F 2413/03* (2013.01); *G02F 2413/05* (2013.01);
(Continued)

(58) Field of Classification Search
CPC ............ G02F 1/13363; G02F 1/133634; G02F 1/134363; G02F 1/1393; G02F 1/1396; G02F 1/1337
(Continued)

(56) References Cited

U.S. PATENT DOCUMENTS 6,504,592 B1 *   1/2003   Takatori ............ G02F 1/133707
                                                         349/111
6,943,858 B2    9/2005   Lyu et al.
(Continued)

FOREIGN PATENT DOCUMENTS

JP        2009-036860        2/2009
JP        2012-003139        1/2012
(Continued)

*Primary Examiner* — Lucy Chien
(74) *Attorney, Agent, or Firm* — F. Chau & Associates, LLC

(57) ABSTRACT

A liquid crystal display includes a first substrate and a second substrate facing each other. A color filter is positioned on the first substrate. A liquid crystal layer is interposed between the first substrate and the second substrate. A first polarizer is positioned on an outer surface of the first substrate. A first compensation film is positioned on an outer surface of the first polarizer. A second compensation film is positioned on an outer surface of the second substrate. A third compensation film is positioned on an outer surface of the second compensation film. A second polarizer is positioned on an outer surface of the third compensation film. The second compensation film includes a negative C-plate, and the third compensation film includes a biaxial film.

16 Claims, 7 Drawing Sheets

(52) U.S. Cl.
CPC ...... *G02F 2413/06* (2013.01); *G02F 2413/11* (2013.01); *G02F 2413/12* (2013.01)

(58) Field of Classification Search
USPC ...... 349/141, 102, 181, 41, 96, 99, 118, 120
See application file for complete search history.

(56) References Cited

U.S. PATENT DOCUMENTS

| | | | |
|---|---|---|---|
| 7,511,792 | B2 | 3/2009 | Chang et al. |
| 8,203,673 | B2 * | 6/2012 | Uesaka ................ G02B 5/3033 349/96 |
| 8,243,239 | B2 | 8/2012 | Choi et al. |
| 8,395,732 | B2 | 3/2013 | Nakano et al. |
| 9,057,917 | B2 * | 6/2015 | Choi ........................ C08G 8/12 349/125 |
| 2002/0149733 | A1 * | 10/2002 | Lyu .................... G02F 1/13363 349/155 |
| 2007/0242188 | A1 * | 10/2007 | Sakai ................... G02B 5/3083 349/96 |
| 2013/0003001 | A1 * | 1/2013 | Inoue et al. .................. 349/123 |
| 2014/0139790 | A1 * | 5/2014 | Kang ................... G02B 5/3083 349/102 |
| 2015/0062499 | A1 * | 3/2015 | Lee ...................... C08F 222/40 349/96 |

FOREIGN PATENT DOCUMENTS

| | | |
|---|---|---|
| KR | 10-0561066 | 3/2006 |
| KR | 10-2010-0060091 | 6/2010 |
| KR | 10-2012-0074064 | 7/2012 |
| KR | 10-2012-0123840 | 11/2012 |
| KR | 10-2013-0110915 | 10/2013 |

* cited by examiner

One biaxial (65/150)
+C-plate
 (Rth 120)
A: 55  P: 65
Lb : 0.89

Compensation of one biaxial (65/270)
A: 65  P: 65
Lb : 1.24

LIQUID CRYSTAL DISPLAY

CROSS-REFERENCE TO RELATED APPLICATION

This application claims priority under 35 USC §119 to Korean Patent Application No. 10-2013-0084330 filed in the Korean Intellectual Property Office on Jul. 17, 2013, the disclosure of which is incorporated by reference herein in its entirety.

TECHNICAL FIELD

Exemplary embodiments of the present invention relate to displays, and more particularly, to liquid crystal displays.

DISCUSSION OF THE RELATED ART

In a vertical alignment (VA) mode, when no electric field is formed between the pixel electrode and the common electrode, a liquid crystal display displays a black image, and when an electric field is formed between the pixel electrode and the common electrode, the liquid crystal display displays a non-black image.

When an electric field is formed between the pixel electrode and the common electrode, the liquid crystal molecules in the liquid crystal layer are arranged so that angles thereof with respect to the pixel electrode or the common electrode are less than 90°, and a displayed image gradually brightens. When the liquid crystal molecules are arranged in a vertical direction, if light is incident on the front surface of the liquid crystal display, a black image having low luminance may be displayed. However, when light obliquely passes through the liquid crystal display, the luminance of a black image displayed may be increased as compared with when light comes to the front surface because the light may experience more phase retardation by the liquid crystal molecules and may be scattered when passing through the thin film transistors and color filters.

SUMMARY

An exemplary embodiment of the present invention provides a liquid crystal display. The liquid crystal display includes a first substrate and a second substrate facing each other. A color filter is positioned on the first substrate. A liquid crystal layer is interposed between the first substrate and the second substrate. A first polarizer is positioned on an outer surface of the first substrate. A first compensation film is positioned on an outer surface of the first polarizer. A second compensation film is positioned on an outer surface of the second substrate. A third compensation film is positioned on an outer surface of the second compensation film. A second polarizer is positioned on an outer surface of the third compensation film. The second compensation film includes a negative C-plate, and the third compensation film includes a biaxial film.

A thickness direction phase retardation value of the biaxial film may range from about 150 nm to about 230 nm.

An in-plane phase retardation value of the biaxial film may range from about 45 nm to about 75 nm.

The thickness direction phase retardation value of the biaxial film may be about 180 nm, and the in-plane phase retardation value may be about 65 nm.

The thickness direction phase retardation value of the negative C-plate may range from about 40 nm to about 120 nm.

The thickness direction phase retardation value of the negative C-plate may be about 90 nm.

The first compensation film may include a phase retardation layer.

The in-plane phase retardation value of the phase retardation layer may be about 0, and the thickness direction phase retardation value may be about 0.

The first compensation film, the second compensation film, and the third compensation film may include triacetyl cellulose (TAC), a cycloolefin polymer (COP)-based resin, and/or an acryl-based polymer resin.

The acryl-based polymer resin may include polymethyl methacrylate (PMMA).

The liquid crystal display according to an exemplary embodiment of the present invention may further include a thin film transistor positioned on the first substrate. A pixel electrode is connected to the thin film transistor. A common electrode is positioned on the second substrate. The liquid crystal layer may be arranged by a vertical electric field generated between the pixel electrode and the common electrode.

The liquid crystal display may further include a light blocking member positioned on the first substrate.

The liquid crystal display may further include a spacer positioned between the first substrate and the second substrate.

The spacer and the light blocking member may be formed of substantially the same material.

The spacer and the light blocking member may be substantially simultaneously formed.

According to an exemplary embodiment of the present invention, a display apparatus comprises a display panel. A first polarizer is disposed on a first surface of the display panel. A first compensation film is disposed on the first polarizer. A second compensation film is disposed on a second surface of the display panel. A third compensation film is disposed on the second compensation film. A second polarizer is disposed on the third compensation film. The second compensation film is configured to meet nx=ny>nz, and the third compensation film is configured to meet nx≠ny≠nz. Here, nx, ny, and nz, respectively, are refractive indexes in x-axis, y-axis, and z-axis directions.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

Figure 1:
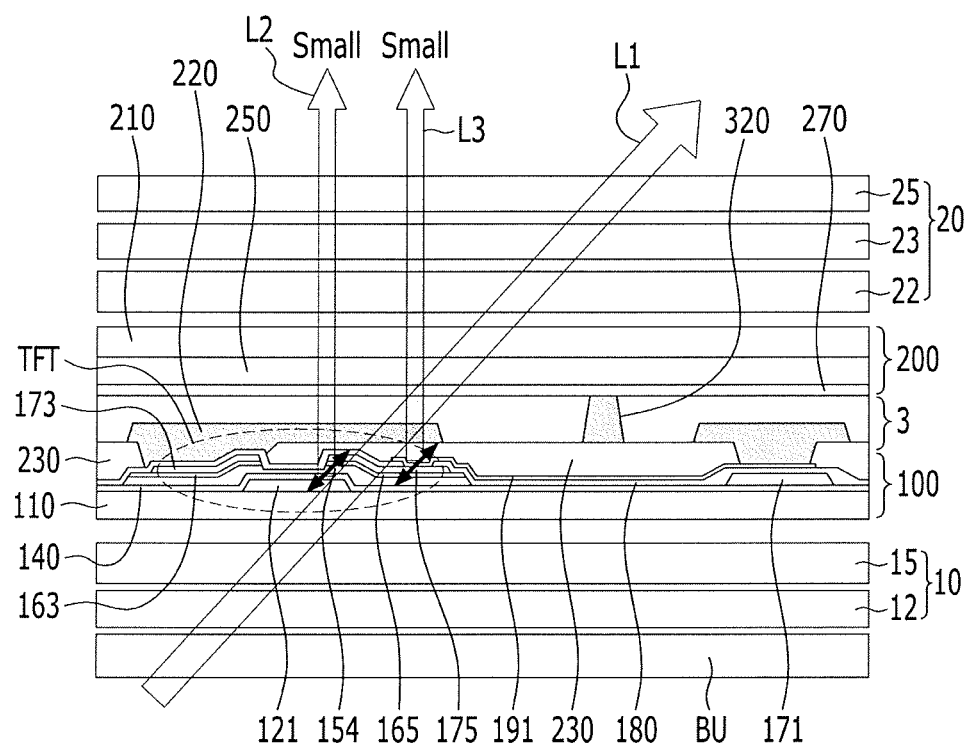
FIG. 1 is a cross-sectional view illustrating a liquid crystal display according to an exemplary embodiment of the present invention.

Exemplary embodiments of the present invention will be hereinafter described in detail with reference to the accompanying drawings. The present invention, however, may be modified in various different ways, and should not be construed as limited to the embodiments set forth herein.

Like reference numerals may designate like or similar elements throughout the specification and the drawings. It will be understood that when an element such as a layer, film, region, or substrate is referred to as being "on," "connected to," or "adjacent to" another element, it can be directly on, connected, or adjacent to the other element, or intervening elements may also be present. As used herein, the singular forms "a," "an," and "the" are intended to include the plural forms as well, unless the context clearly indicates otherwise.

FIG. 1 is a cross-sectional view illustrating a liquid crystal display according to an exemplary embodiment of the present invention.

Referring to FIG. 1, the liquid crystal display includes a lower display panel 100 and an upper display panel 200 facing each other, a first optical unit 10 positioned on an outer surface of the lower display panel 100, and a second optical unit 20 positioned on an outer surface of the upper display panel 200. The first optical unit 10 includes a first compensation film 12 and a first polarizer 15, and the second optical unit 20 includes a second compensation film 22, a third compensation film 23, and a second polarizer 25.

The lower display panel 100 includes a first substrate 110, a gate line 121 including a gate electrode positioned on the first substrate 110, a gate insulating layer 140 positioned on the gate line 121, a semiconductor layer 154 positioned on the gate insulating layer 140, ohmic contacts 163 and 165 positioned on the semiconductor layer 154, a data line 171 including a source electrode 173 and a drain electrode 175 positioned on the ohmic contacts 163 and 165, a passivation layer 180 covering the source electrode 173 and the drain electrode 175, a pixel electrode 191 positioned on the passivation layer 180, and a color filter 230 positioned on the pixel electrode 191. Alternatively, the color filter 230 may be positioned under the pixel electrode 191.

A light blocking member 220 is positioned on the color filter 230. The light blocking member 220 is also called a black matrix, and prevents light leakage between the pixel electrodes 191. The light blocking member 220 may be positioned on portions corresponding to the gate line 121 and the data line 171 and a portion corresponding to a thin film transistor. The light blocking member 220 may be positioned between the adjacent color filters 230.

In the liquid crystal display according to an exemplary embodiment of the present invention, the color filter 230 and the light blocking member 220 are positioned in the lower display panel 100. However, exemplary embodiments of the present invention are not limited thereto. For example, the color filter 230 is positioned in the lower display panel 100, and the light blocking member may be positioned in the upper display panel 200.

The upper display panel 200 includes an overcoat 250 positioned on the second substrate 210 and a common electrode 270 positioned on the overcoat 250. The common electrode 270 is formed of a transparent conductive material.

The common electrode 270 receives a common voltage. Alternatively, the overcoat 250 may be omitted.

In an exemplary embodiment of the present invention, since the upper display panel 200 does not have any patterns, no scattering element may be left, thus minimizing leakage of scattered light at a front surface of the upper display panel 200.

A liquid crystal layer 3 is interposed between the lower display panel 100 and the upper display panel 200. A spacer 320 is positioned between the display panel 100 and the upper display panel 200 and maintains a cell gap of the liquid crystal layer 3. The spacer 320 may be formed of substantially the same material as the light blocking member 220. The spacer 320 and the light blocking member 220 may be formed substantially simultaneously in the same process. However, the spacer 320 and the light blocking member 220 need not be formed simultaneously in the same process. The spacer 320 and the light blocking member 220, respectively, can be formed of different materials from each other. The spacer 320 and the light blocking member 220, respectively, may be formed in different processes from each other.

The gate electrode, the source electrode 173, and the drain electrode 175 form a thin film transistor (TFT). The thin film transistor (TFT) is electrically connected to the pixel electrode 191. The pixel electrode 191 is formed of a transparent conductive material and receives data voltages via the data line 171 and the thin film transistor (TFT).

The liquid crystal layer 3 may be driven in a vertical alignment mode. For example, liquid crystal molecules in the liquid crystal layer 3 are arranged in a direction that is substantially perpendicular to a surface of the first substrate 110 when no electric field is formed between the pixel electrode 191 and the common electrode 270. When an electric field is formed between the pixel electrode 191 and the common electrode 270, the liquid crystal molecules in the liquid crystal layer 3 are inclined to the surface of the first substrate 110, an inclination angle is increased as the intensity of the electric field is increased. The liquid crystal molecules are arranged substantially parallel with the surface of the first substrate 110.

The first polarizer 15 of the first optical unit 10 is positioned on an outer surface of the lower display panel 100, and the first compensation film 12 positioned on an outer surface of the first polarizer 15. The first compensation film 12 according to an exemplary embodiment of the present invention may include a phase retardation layer. Light generated from a light source BU disposed on a lower portion of the first polarizer 15 passes through the first compensation film 12 and the first polarizer 15 to the lower display panel 100.

The second optical unit 20 includes the second compensation film 22 positioned on an outer surface of the upper display panel 200, the third compensation film 23 positioned on an outer surface of the second compensation film, and the second polarizer 25 positioned on an outer surface of the third compensation film 23. The second compensation film 22 according to an exemplary embodiment of the present invention may include a negative C-plate, and the third compensation film 23 may include a biaxial film.

A compensation film has refractive index (nx, ny, and nz) values in x, y, and z-axis directions, respectively. The negative C-plate satisfies a refractive index relationship of $nx=ny>nz$, and the biaxial film satisfies a refractive index relationship of $nx \neq ny \neq nz$. An in-plane phase retardation value Ro and a thickness direction phase retardation value Rth are defined by the following Equations 1 and 2, where d is a thickness of the compensation film.

$$Ro = (nx - ny) * d \quad \text{[Equation 1]}$$

$$Rth = ((nx + ny)/2 - nz) * d \quad \text{[Equation 2]}$$

When the third compensation film 23 includes a biaxial film, the thickness direction phase retardation value Rth of the biaxial film may be in a range from about 150 nm to about 230 nm, and the in-plane phase retardation value Ro of the biaxial film may be in a range from about 45 nm to about 75 nm. The thickness direction phase retardation value Rth of the biaxial film may be about 180 nm, and the in-plane phase retardation value Ro may be about 65 nm.

When the second compensation film 22 includes the negative C-plate, the thickness direction phase retardation value Rth of the negative C-plate may be in a range from about 40 nm to about 120 nm. The thickness direction phase retardation value Rth of the negative C-plate may be about 90 nm.

When the first compensation film 12 may include the phase retardation layer, the in-plane phase retardation value Ro may be substantially 0, and the thickness direction phase retardation value Rth may be substantially 0.

The first compensation film 12 and the second compensation film 22 may include triacetyl cellulose (TAC), and/or cycloolefin polymer (COP)-based and acryl-based polymer resins. The acryl-based polymer resin may include polymethyl methacrylate (PMMA).

Light sequentially passes through the lower display panel 100, the liquid crystal layer 3, the upper display panel 200, and the second optical unit 20, and an image may be thus displayed.

Figure 2:
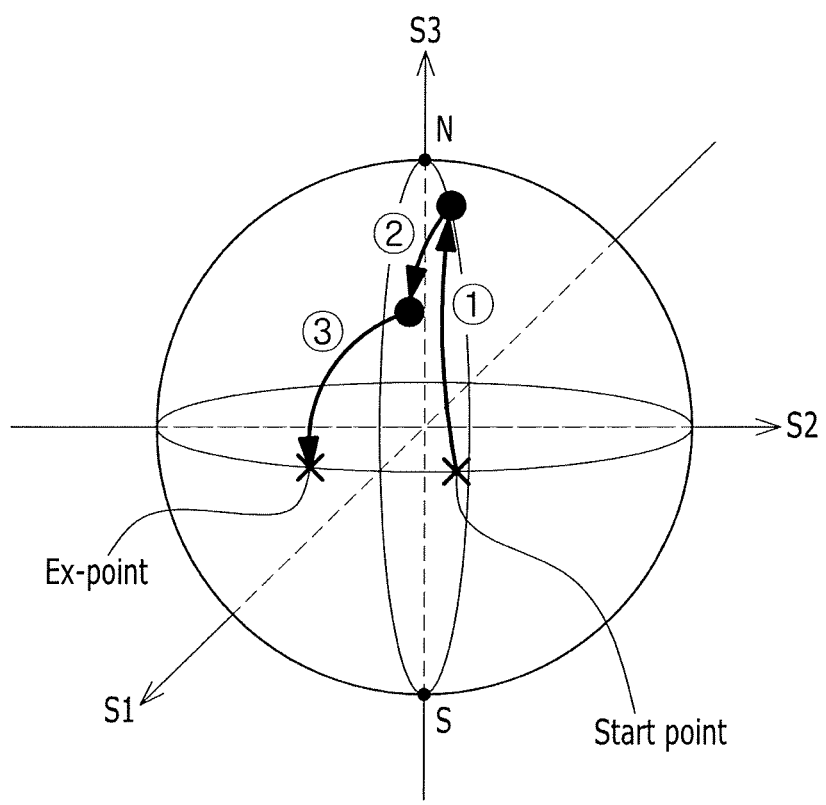
FIG. 2 is a view illustrating a Poincare sphere illustrating a polarization state according to a path of light in a liquid crystal display of FIG. 1, according to an exemplary embodiment of the present invention.

FIG. 2 is a view illustrating a Poincare sphere illustrating a polarization state according to the path of light in a liquid crystal display of FIG. 1, according to an exemplary embodiment of the present invention.

Referring to FIGS. 1 and 2, light L1 generated from a light source positioned on the lower portion of the first optical unit 10 passes through the first optical unit 10. Since a phase difference of the first compensation film 12 is substantially close to 0, the polarization state on the Poincare sphere is substantially close to a linear polarization state. Light passing through the first optical unit 10 is incident on the lower display panel 100 and meets the thin film transistor (TFT) and the color filter 230 to cause scatterings L2 and L3. Since scatterings L2 and L3 are generated by the thin film transistor TFT and the color filter 230, respectively, light leakage is minimized. Light passing through the first optical unit 10 may meet the light blocking member 220 and may be thus scattered. The way the light is scattered by the light blocking member 220 is similar to the way light is scattered by the thin film transistor (TFT) and the color filter 230. While light passes through the lower display panel 100 and the liquid crystal layer 3, the polarization state of the light on the Poincare sphere moves along ① and is positioned very close to the geographical North Pole N. While light passing through the liquid crystal layer 3 is incident on the upper display panel 200 and light passing through the upper display panel 200 passes through the second compensation film 22, the polarization state of the light on the Poincare sphere slightly moves along ② in an opposite direction of path ①. While light passing through the second compensation film 22 passes through the third compensation film 23, the polarization state of the light on the Poincare sphere moves along ③ to an Ex-point positioned at an equatorial plane (EP) of the Poincare sphere.

In the liquid crystal display according to an exemplary embodiment of the present invention, where the color filter 230 and the light blocking member 220 are positioned on the lower display panel 100, the first compensation film 12 disposed on the outer surface of the first polarizer 15 includes a phase retardation layer in which the in-plane phase retardation value Ro is 0 and the thickness direction phase retardation value Rth is close to 0, and the second compensation film 22 and the third compensation film 23 disposed between the upper display panel 200 and the second polarizer 25 include the negative C-plate and the biaxial film, respectively. Accordingly, light leakage that might be caused by a scattering of light occurring in the thin film transistor (TFT), the color filter 230, and the light blocking member 220 may be minimized.

When the second compensation film 22 including the negative C-plate is omitted and the thickness direction phase retardation value Rth of the third compensation film 23 formed of the biaxial film is further increased, a per-wavelength dispersion effect of light increases, and thus, all of the light beams passing through the color filters 230 for displaying different colors might not be sent to the Ex-point. In an exemplary embodiment of the present invention, the per-wavelength dispersion of light may be reduced by relatively reducing the thickness direction phase retardation value Rth of the third compensation film 23 including the biaxial film and using the second compensation film 22 including the negative C-plate having an inverse dispersion effect. Accordingly, the lateral surface contrast ratio (CR) of the display may be increased.

Figure 3:
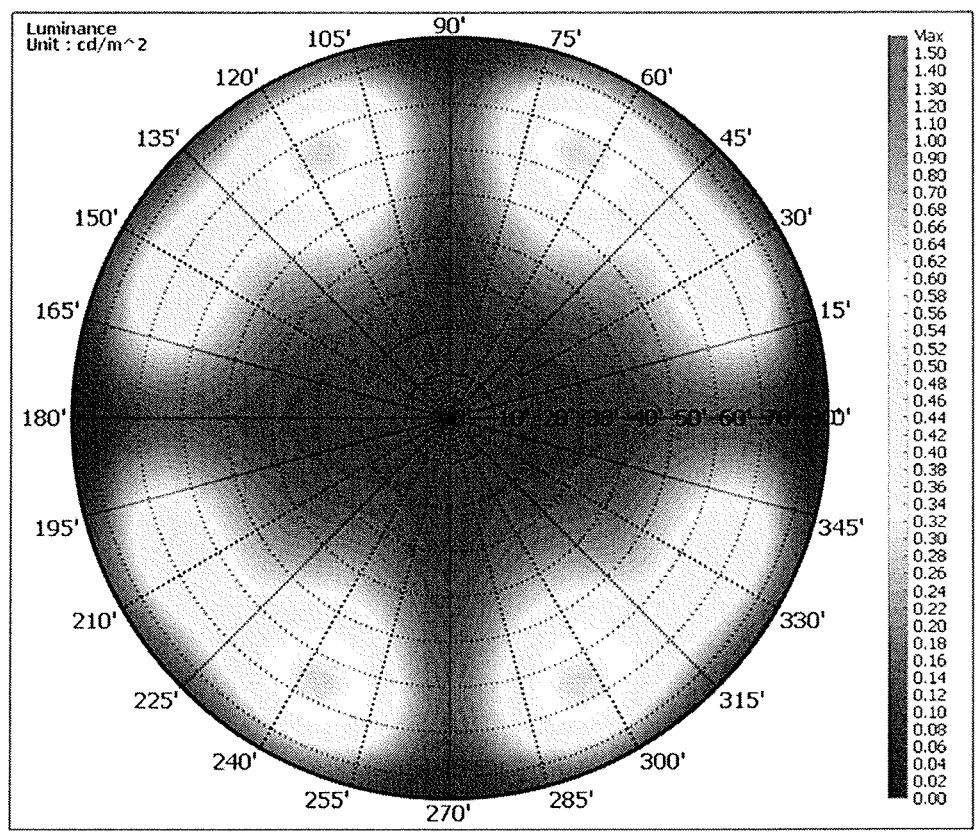
FIGS. 3 to 5 are simulation results illustrating the luminance of a black state of a liquid crystal display according to the exemplary embodiment of the present invention.
Figure 4:
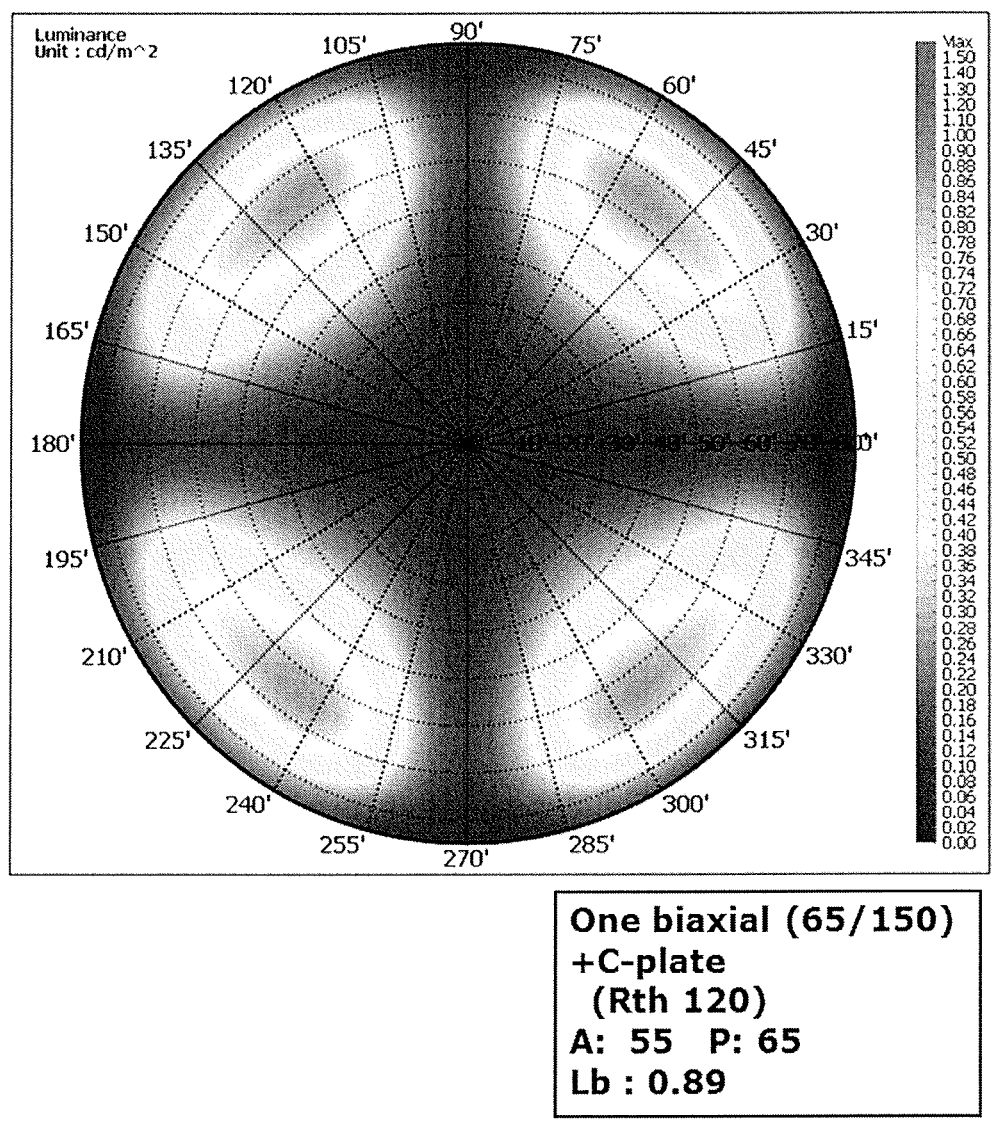
Figure 5:
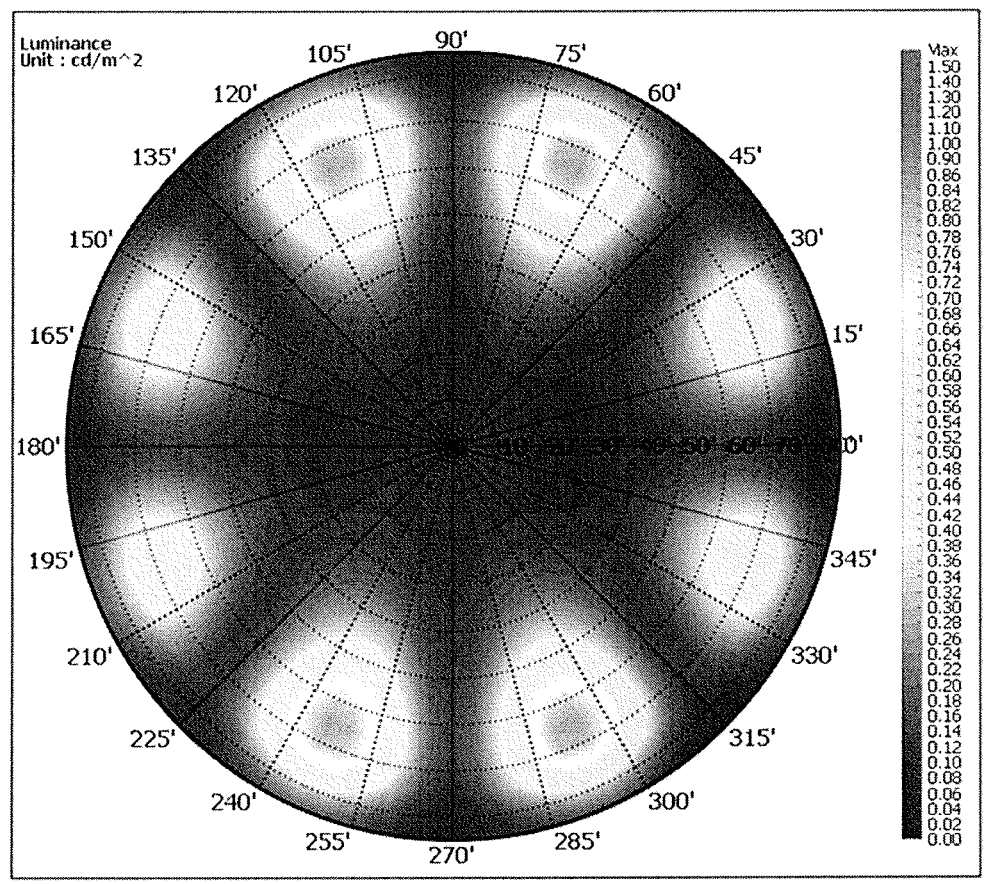
Figure 6:
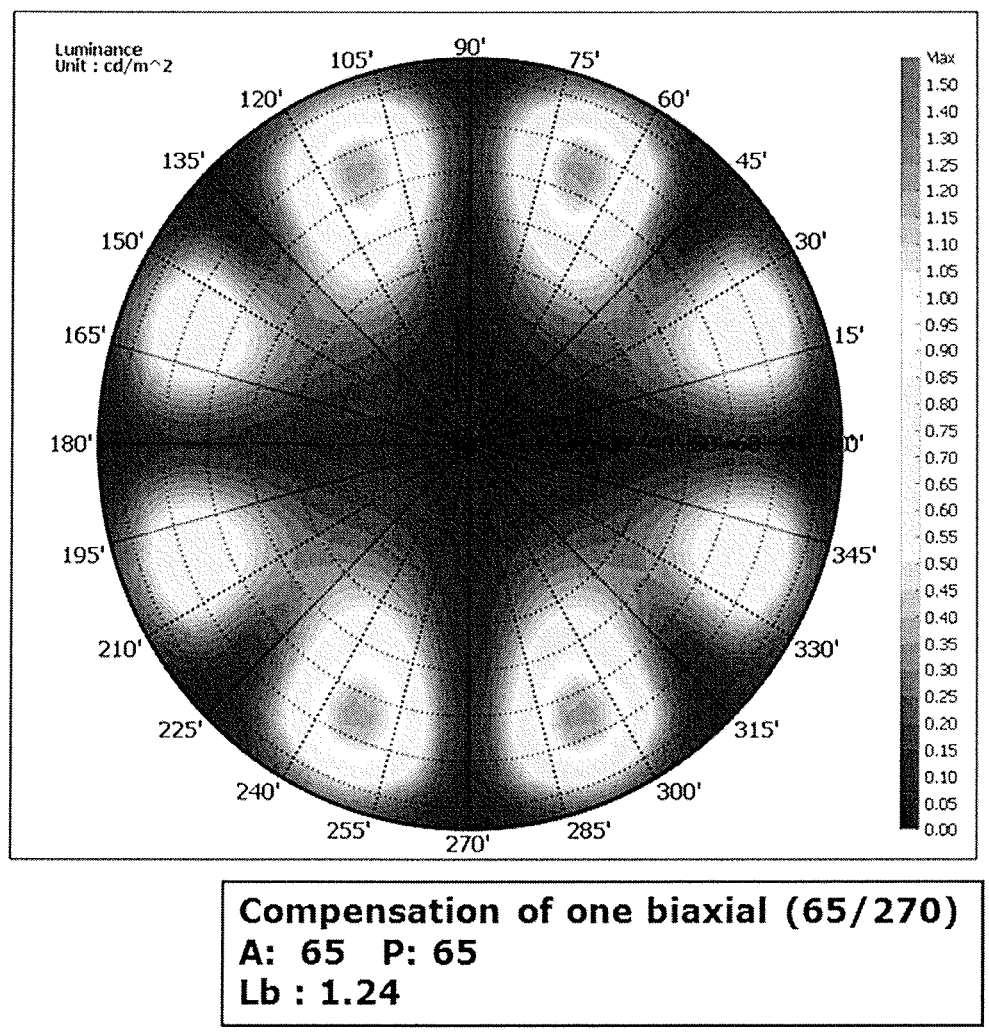
FIG. 6 is a simulation result illustrating the luminance of a black state of a liquid crystal display according to a Comparative Example.
Figure 7:
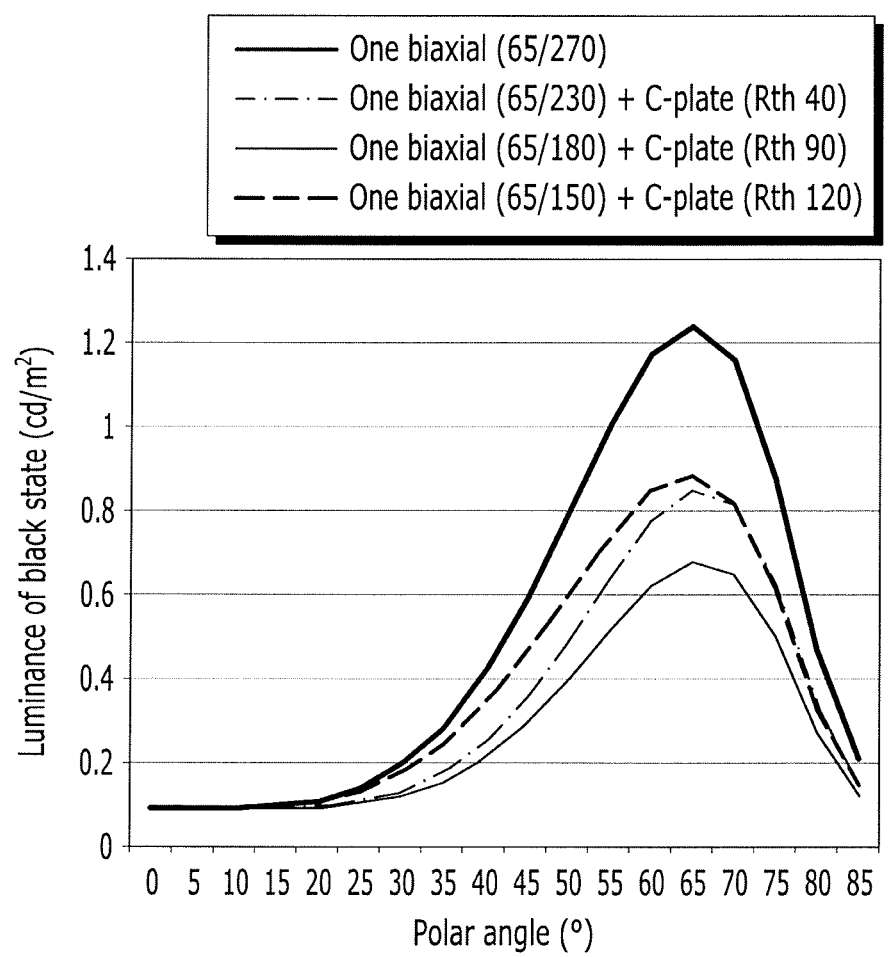
FIG. 7 is a graph illustrating the luminance of a black state according to azimuth angles of a liquid crystal display according to the present invention and the liquid crystal display according to the Comparative Example.

FIGS. 3 to 5 are simulation results illustrating the luminance of a black state of a liquid crystal display according to an exemplary embodiment of the present invention, and FIG. 6 is a simulation result illustrating the luminance of a black state of a liquid crystal display according to a Comparative Example. FIG. 7 is a graph illustrating the luminance of a black state according to azimuth angles of a liquid crystal display according to an exemplary embodiment of the present invention and a liquid crystal display according to a Comparative Example.

FIG. 3 illustrates the luminance of a black state when the second compensation film 22 of a liquid crystal display according to an exemplary embodiment of the present invention includes a negative C-plate with a thickness direction phase retardation value Rth of 90 nm, and the third compensation film 23 includes a biaxial film with a thickness direction phase retardation value Rth of 180 and an in-plane phase retardation value Ro of 65.

As shown in FIG. 3, the luminance of light is highest, e.g., 0.68 cd/m², when an azimuth angle is substantially 295° and a polar angle is substantially 65°.

FIG. 4 illustrates the luminance of a black state when the second compensation film 22 of a liquid crystal display according to an exemplary embodiment of the present invention includes a negative C-plate with a thickness direction phase retardation value Rth of 120 nm, and the third compensation film 23 includes a biaxial film with a thickness direction phase retardation value Rth of 150 and an in-plane phase retardation value Ro of 65.

As shown in FIG. 4, the luminance of light is highest, e.g., 0.89 cd/m², when the azimuth angle is 55° and the polar angle is 65°

FIG. 5 illustrates the luminance of a black state when the second compensation film 22 of a liquid crystal display according to an exemplary embodiment of the present invention includes a negative C-plate with a thickness direction phase retardation value Rth of 40 nm, and the third compensation film 23 includes a biaxial film with a thickness direction phase retardation value Rth of 230 and an in-plane phase retardation value Ro of 65.

As shown in FIG. 5, the luminance of light is highest, e.g., 0.85 cd/m², when the azimuth angle is 65°, and the polar angle is 65°.

FIG. 6 illustrates the luminance of a black state in a liquid crystal display according to a Comparative Example. In this Comparative Example, the second compensation film 22 is not included, and the third compensation film 23 includes a biaxial film with a thickness direction phase retardation value Rth of 270 and an in-plane phase retardation value Ro of 65.

As shown in FIG. 6, the luminance of light is highest, e.g., 1.24 cd/m², when the azimuth angle is 65° and the polar angle is 65°

As illustrated in FIG. 6, in the Comparative Example, a phase difference of the third compensation film is enlarged and the second compensation film is not formed. The highest luminance of light in the black state is 1.24 cd/m². As described above in connection with FIGS. 3 to 5, in the liquid crystal display according to an exemplary embodiment of the present invention, the highest luminance of light in the black state is in a range from 0.68 cd/m² to 0.89 cd/m². In the liquid crystal display according to an exemplary embodiment of the present invention, the luminance of light is relatively low in the black state, and no or little light leakage may be considered to occur. Therefore, according to an exemplary embodiment of the present invention, the contrast ratio of a liquid crystal display may be improved.

FIG. 7 is a graph illustrating the luminance in a black state according to each polar angle and each azimuth angle at which the luminance of light is highest in the black state based on the simulation results shown in FIGS. 3 to 6.

As shown in FIG. 7, the luminance in the black state increases as the polar angle varies from 0° to 65°, and decreases as the polar angle varies from 65° to 90°. A liquid crystal display according to an exemplary embodiment of the present invention shows a relatively low luminance in the black state at each polar angle as compared with a liquid crystal display according to the Comparative Example. Therefore, the liquid crystal display according to an exemplary embodiment of the present invention may have an increased contrast ratio by reducing the luminance in the black state.

For example, a liquid crystal display according to an exemplary embodiment of the present invention has a second compensation film 22 including a negative C-plate with a thickness direction phase retardation value Rth of 90 nm and a third compensation film 23 including a biaxial film with a thickness direction phase retardation value Rth of 180 and an in-plane phase retardation value Ro of 65. The luminance of the liquid crystal display is lowest in the black state.

While this invention has been shown and described in connection with exemplary embodiments thereof, it is to be understood by those of ordinary skill in the art that various changes in form and detail may be made thereto without departing from the spirit and scope of the invention as defined by the following claims.

What is claimed is:

1. A liquid crystal display, comprising:
a first substrate and a second substrate facing each other;
a thin film transistor positioned on the first substrate;
a color filter positioned on the first substrate;
a common electrode positioned on the second substrate;
a liquid crystal layer interposed between the first substrate and the second substrate;
a first polarizer positioned on an outer surface of the first substrate;
a first compensation film positioned on an outer surface of the first polarizer;
a second polarizer positioned on an outer surface of the second substrate, and
a second compensation film and a third compensation film positioned between the second substrate and the second polarizer,
wherein the third compensation film, comprising a negative C-plate, is positioned between the second compensation film, comprising a biaxial film, and the second polarizer.

2. The liquid crystal display of claim 1, wherein a thickness direction phase retardation value of the biaxial film ranges from about 150 nm to about 230 nm.

3. The liquid crystal display of claim 1, wherein an in-plane phase retardation value of the biaxial film ranges from about 45 nm to about 75 nm.

4. The liquid crystal display of claim 3, wherein a thickness direction phase retardation value of the biaxial film is about 180 nm, and the in-plane phase retardation value of the biaxial film is about 65 nm.

5. The liquid crystal display of claim 1, wherein a thickness direction phase retardation value of the negative C-plate ranges from about 40 nm to about 120 nm.

6. The liquid crystal display of claim 5, wherein the thickness direction phase retardation value of the negative C-plate is about 90 nm.

7. The liquid crystal display of claim 1, wherein the first compensation film includes a phase retardation layer.

8. The liquid crystal display of claim 7, wherein an in-plane phase retardation value of the phase retardation layer is about 0, and a thickness direction phase retardation value of the phase retardation layer is about 0.

9. The liquid crystal display of claim 1, wherein the first compensation film, the second compensation film, and the third compensation film include triacetyl cellulose (TAC), a cycloolefin polymer (COP)-based resin, and/or an acryl-based polymer resin.

10. The liquid crystal display of claim 9, wherein the acryl-based polymer resin includes polymethyl methacrylate (PMMA).

11. The liquid crystal display of claim 1, further comprising:
a pixel electrode connected to the thin film transistor.

12. The liquid crystal display of claim 11, further comprising a light blocking member positioned on the first substrate.

13. The liquid crystal display of claim 12, further comprising a spacer positioned between the first substrate and the second substrate.

14. The liquid crystal display of claim 13, wherein the spacer and the light blocking member are formed of substantially the same material.

15. The liquid crystal display of claim 14, wherein the spacer and the light blocking member are substantially simultaneously formed.

16. The liquid crystal of claim 1, wherein the second compensation film is configured to meet nx=ny>nz, and the third compensation film is configured to meet nx≠ny≠nz, wherein nx, ny, and nz, respectively, are refractive indexes in x-axis, y-axis, and z-axis directions.

* * * * *